US006866108B2

(12) United States Patent
Borgwarth et al.

(10) Patent No.: US 6,866,108 B2
(45) Date of Patent: Mar. 15, 2005

(54) WHEELED-TRACKED VEHICLE HYBRID

(75) Inventors: Dennis W. Borgwarth, Anoka, MN (US); Brad J. Breeggemann, Maple Grove, MN (US)

(73) Assignee: United Defense, L.P., Arlington, VA (US)

( * ) Notice: Subject to any disclaimer, the term of this patent is extended or adjusted under 35 U.S.C. 154(b) by 0 days.

(21) Appl. No.: 10/197,371

(22) Filed: Jul. 17, 2002

(65) Prior Publication Data

US 2004/0011574 A1 Jan. 22, 2004

(51) Int. Cl.$^7$ .............................................. B62D 55/00
(52) U.S. Cl. ...................... 180/9.42; 180/9.36; 180/9.3
(58) Field of Search .............................. 180/6.62, 6.7, 180/9.1, 9.21, 9.26, 9.28, 9.3, 9.32, 9.36, 9.42

(56) References Cited

U.S. PATENT DOCUMENTS

| 576,764 | A | | 2/1897 | Price | |
|---|---|---|---|---|---|
| 995,538 | A | | 6/1911 | Heverling | |
| 1,296,309 | A | | 3/1919 | Netzel | |
| 1,550,982 | A | | 8/1925 | Phillips | |
| 1,729,374 | A | | 9/1929 | Ehrhart | |
| 2,051,496 | A | | 8/1936 | Sarrazin | 180/5 |
| 2,105,042 | A | | 1/1938 | Kegresse | 180/9.1 |
| 2,309,947 | A | | 2/1943 | Gibbs et al. | |
| 2,856,014 | A | * | 10/1958 | Garnier | 180/9.3 |
| 3,203,119 | A | | 8/1965 | Penote et al. | |
| 3,299,849 | A | | 1/1967 | Pitchford | 115/1 |
| 3,417,832 | A | * | 12/1968 | Ziccardi | 180/9.3 |
| 3,469,553 | A | | 9/1969 | Gagne | 115/1 |
| 3,526,290 | A | | 9/1970 | Caudill | 180/15 |
| 4,204,583 | A | | 5/1980 | Toyoura et al. | 180/9.28 |
| 4,340,127 | A | | 7/1982 | Broberg | 180/327 |
| 4,459,932 | A | | 7/1984 | Hildebrand | 114/270 |
| 4,482,407 | A | * | 11/1984 | Stephens et al. | 149/19.4 |
| 4,541,498 | A | | 9/1985 | Pitchford | 180/9.26 |
| 4,560,019 | A | * | 12/1985 | Barber | 180/9.32 |
| 4,702,331 | A | * | 10/1987 | Hagihara et al. | 180/9.32 |
| 4,821,824 | A | | 4/1989 | Gilbert | 180/9.28 |
| 5,287,938 | A | | 2/1994 | Welling | 180/9.3 |
| 5,884,718 | A | * | 3/1999 | Yamashiro et al. | 180/9.32 |
| 6,044,921 | A | * | 4/2000 | Lansberry | 180/9.36 |
| RE37,098 | E | * | 3/2001 | Lansberry | 180/9.36 |
| 6,216,807 | B1 | * | 4/2001 | Eckhoff | 180/6.7 |

OTHER PUBLICATIONS

International Search Report—PCT/US03/22092.

* cited by examiner

Primary Examiner—Lesley D. Morris
Assistant Examiner—L. Lum
(74) Attorney, Agent, or Firm—Patterson, Thuente, Skaar & Christensen, P.A.

(57) ABSTRACT

A vehicle for use on a battlefield, having a hull with at least one endless track unit mounted underneath, and with a plurality of selectively vertically moveable wheels. The endless track unit may cover substantially all of the bottom side of the vehicle and may wrap upward to cover a portion of the front of the vehicle. The vehicle may be operated with only the wheels, the wheels and the endless track unit in combination, or only the endless track unit in contact with the ground. The vehicle has a height variable suspension element, which may be a hydro-pneumatic spring, coupled to each wheel. The suspension elements are connected with a power unit and a control unit to allow selective controllability of suspension height, and corresponding extension or retraction of the wheels. The wheels may also be provided with a resilient suspension mechanism that is either separate or formed by the height variable suspension elements. The vehicle may have a plurality of motors, each motor driving a separate wheel, and the wheels may be operable at separately selectable speeds. The endless track unit may have multiple driving rollers, each driving roller having a separate driving motor. Further, the endless track unit may have a rigid suspension.

40 Claims, 5 Drawing Sheets

WHEELED-TRACKED VEHICLE HYBRID

BACKGROUND OF THE INVENTION

1. Field of the Invention

The invention relates to vehicles. More specifically, it relates to vehicles for use on a battlefield.

2. Discussion of the Prior Art

Essential qualities for a light to medium weight military vehicle are rapid maneuverability coupled with the ability to successfully negotiate difficult terrain. Also, such a vehicle must be reliable and resistant to damage from rough terrain, land mines, enemy fire and other hazards of the battlefield. The availability of operating transportation is often critical to the success of battlefield operations, and as a result, yet another criteria for a battlefield vehicle is that it be relatively simple and easy to repair when necessary. It should also be as lightweight as possible to allow for transport by air.

Battlefield vehicles have generally either been equipped with wheels or track drives as the primary driving means. Wheels offer speed and rapid maneuverability as an advantage. A disadvantage, however, is that a wheeled vehicle may become easily stuck in deep mud or other difficult terrain. Also, the rubber tires used with wheels are vulnerable to damage. By comparison, vehicles with a properly configured track drive can generally negotiate even the most difficult of terrain. The track drive is also normally more damage resistant. Generally, however, the track drive makes the vehicle slower and less maneuverable. Also, the suspension required for a full-time track drive can be heavy and complex, making for more difficult repairs. A vehicle for battlefield use that combines the advantages of wheeled and tracked vehicles while minimizing the disadvantages of each is a most desirable goal. Previous attempts to combine the advantages of wheels and tracks have not provided a vehicle suitable for operations on the modern battlefield.

U.S. Pat. No. 576,764 issued to Price, for instance, discloses a traction engine having an auxiliary endless track drive combined with road wheels and driven mechanically at the same speed as the wheels. The endless track is engaged with the ground at all times, limiting maneuverability and speed of the vehicle in all conditions. Another example of a vehicle with an auxiliary track drive can be found in U.S. Pat. No. 995,538 to Heverling, which discloses an auxiliary track drive that can be disengaged from the ground. This concept requires a complex mechanism for retracting the endless track assembly. Moreover, the wheels and tracks are each mechanically connected to the vehicle engine, relating the track speed to the engine speed and wheel speed. As a result, there is no selective adjustment of relative speed of the tracks to wheels, as is sometimes needed to traverse difficult terrain. A still further example can be seen in U.S. Pat. No. 3,469,553 to Gagne, which discloses an amphibious vehicle with an endless track and wheels. The track is normally out of contact with the ground, but serves to drive the wheels at all times. When the vehicle sinks into snow or other soft terrain, the track engages the ground and provides some traction assist. Again, the wheels and track are mechanically connected. Neither the wheels nor the track is vertically adjustable, providing no choice to the operator for selecting when the different driving means are to be used. Instead the operator must wait for the vehicle to become fully mired in the terrain before using the traction assist. Also, the track mechanism of this vehicle occupies a great deal of area within the vehicle hull, reducing available capacity and raising the vehicle center of gravity. These deficiencies of all of these examples, coupled with their generally complex and inflexible natures, make them unsuitable to be adapted for a modern battlefield vehicle.

What is needed is a vehicle combining the rapid maneuverability of wheels with the terrain negotiating ability of tracks and coupled with the desirable characteristics of: (a) having completely separate and adjustable wheel and track drives; (b) a simple, easily repairable, track assembly without heavy and complex suspension parts, that is selectively engagable when needed to negotiate difficult terrain or whenever desired; and (c) wheels that can be selectively disengaged from ground contact to effect weight transfer to the track, increasing traction and stability.

SUMMARY OF THE INVENTION

The present invention is a vehicle having a combination of wheels and an endless track drive. The wheels are equipped with an active suspension and are selectively retractable from ground contact. The endless track is provided on the bottom of the vehicle hull to increase access for repairs, and has no active suspension, reducing weight and making it more easily repairable. It can be placed in contact with the ground when desired by retracting the wheels. The wheels and track may be provided with separate drive means allowing them to operate at different rotational speeds when desired.

The vehicle of the present invention can be operated with the wheels down, allowing for high speed and rapid maneuverability. In rough terrain, the wheels can be partially or completely retracted, allowing the track, which is rigidly mounted on the underside of the hull, to contact the ground. The wheels and track can be operated simultaneously, at the same or different rotational speeds, or the track can be used alone. The lack of a suspension for the track assembly provides for a simpler, lighter weight vehicle, and allows for a profile low enough so that the assembly can be mounted completely outside the vehicle hull, allowing easier servicing. In addition, the non-suspended track makes for a more stable weapons platform.

The invention may be characterized as a vehicle for use on a battlefield, having a hull with at least one endless track unit mounted underneath, and with a plurality of selectively vertically moveable wheels. The endless track unit may cover substantially all of the bottom side of the vehicle and may wrap upward to cover a portion of the front of the vehicle. In this embodiment, the vehicle may be operated with only the wheels, the wheels and the endless track unit in combination, or only the endless track unit in contact with the ground. The vehicle has a height variable suspension element, which may be a hydro-pneumatic spring, coupled to each wheel. The suspension elements are connected with a power unit and a control unit to allow selective controllability of suspension height, and corresponding extension or retraction of the wheels. The wheels may also be provided with a resilient suspension mechanism that is either separate or formed by the height variable suspension elements. The vehicle may have a plurality of motors, each motor driving a separate wheel, and the wheels may be operable at separately selectable speeds. The endless track unit may have multiple driving rollers, each driving roller having a separate driving motor. Further, the endless track unit may have a rigid suspension.

Another embodiment of the invention may be characterized as a vehicle for use on a battlefield, having a hull, at least one endless track unit mounted under the hull, and wheels mounted on the hull, each of the wheels being vertically movable with respect to the hull. Means for selectively vertically moving each of the wheels, which may be a hydro-pneumatic suspension system, is provided, so that the vehicle may be operated with only the wheels, the wheels and the endless track unit in combination, or only the endless track unit in contact with the ground. The wheels may have a resilient suspension mechanism, which may be separate, or a part of the means for selectively vertically moving each of the wheels. The vehicle may have a motor driving a separate one of the wheels, along with control means for operating each of the motors at a separately selectable speed. The vehicle may have an upwardly sloped front surface, and the endless track unit may cover a portion of the front surface. The endless track unit may have multiple driving rollers, each with a separate driving motor, and further may have a rigid suspension.

The invention may also be characterized as a vehicle for use on a battlefield, having a hull, at least one endless track mechanism fixedly coupled to the hull, at least one ground engaging traction mechanism operably coupled to the hull, and a suspension assembly for shifting the ground engaging traction mechanism along a path of travel between a first position operably engaging the ground of the battlefield and a second position clearing the ground, whereby the vehicle may be selectively self-transported over the ground by the endless track mechanism, the ground engaging traction mechanism, or the endless track mechanism and the ground engaging traction mechanism in combination. In one preferred embodiment, the ground engaging traction mechanism is a plurality of wheels, and the suspension assembly comprises a plurality of height variable suspension elements, which may be hydro-pneumatic springs, a power unit, and a control unit, each of the height variable suspension elements being coupled to a separate one of the plurality of wheels and disposed so as to vertically move each of the plurality of wheels with movement of the height variable suspension elements. The plurality of height variable suspension elements may be controllable with the control unit. Each one of the plurality of wheels may have a resilient suspension mechanism. Further, the vehicle may have a plurality of motors, each motor driving a separate one of the plurality of wheels, along with control means for operating each of the plurality of motors at a separately selectable speed.

The invention may also be characterized as a vehicle for use on a battlefield, comprising a hull having a front portion and a back portion. The hull has at least a back surface, a front surface, a first side surface, an opposing second side surface, and a bottom surface with an upwardly sloped front portion. At least one endless track unit, which may have an elastomeric track belt, is disposed under the hull, substantially parallel with the bottom surface, and extends from the back surface to the front surface, and covers a portion of the front surface. The endless track unit is rigidly connected to the hull, and may have a plurality of driving rollers, each of which has a separate track driving motor. Further, the vehicle has first and second pairs of selectively vertically moveable wheels coupled to the hull, each wheel disposed proximate to a separate one of the first side surface of the second side surface of the vehicle. Each wheel has a motor, which may be operable at separately selectable speeds by means of a controller. The vehicle may have a hydro-pneumatic suspension system resiliently coupling each of the wheels with the hull. The hydro-pneumatic suspension system may have a control unit adapted to selectively vertically move each wheel Alternatively, the vehicle may have each wheel coupled to a height variable suspension element, which is in turn connected with a power unit and a control unit. Further, the wheels may be provided with a resilient suspension mechanism.

The invention may also be characterized as a method of traversing soft terrain using a vehicle, wherein the vehicle has a hull with at least one endless track unit mounted under the hull. The endless track unit has a plurality of driving rollers, each having a separate driving motor. The hull further has selectively vertically moveable wheels mounted on the hull, each coupled to a separate motor. In the method, the wheels are moved vertically so that only the wheels are in contact with the ground. The vehicle is driven onto the soft terrain, and the wheels are moved vertically upward so that the endless track is in contact with the soft terrain. Power is applied to the driving motors of the driving rollers of the endless track unit so as to propel the vehicle across the soft terrain. The method may also include the step of selectively applying power to at least one of the separate motors connected to the wheels simultaneously with applying power to the driving motors of the driving rollers of the endless track unit.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE PREFERRED EMBODIMENTS

Figure 1:
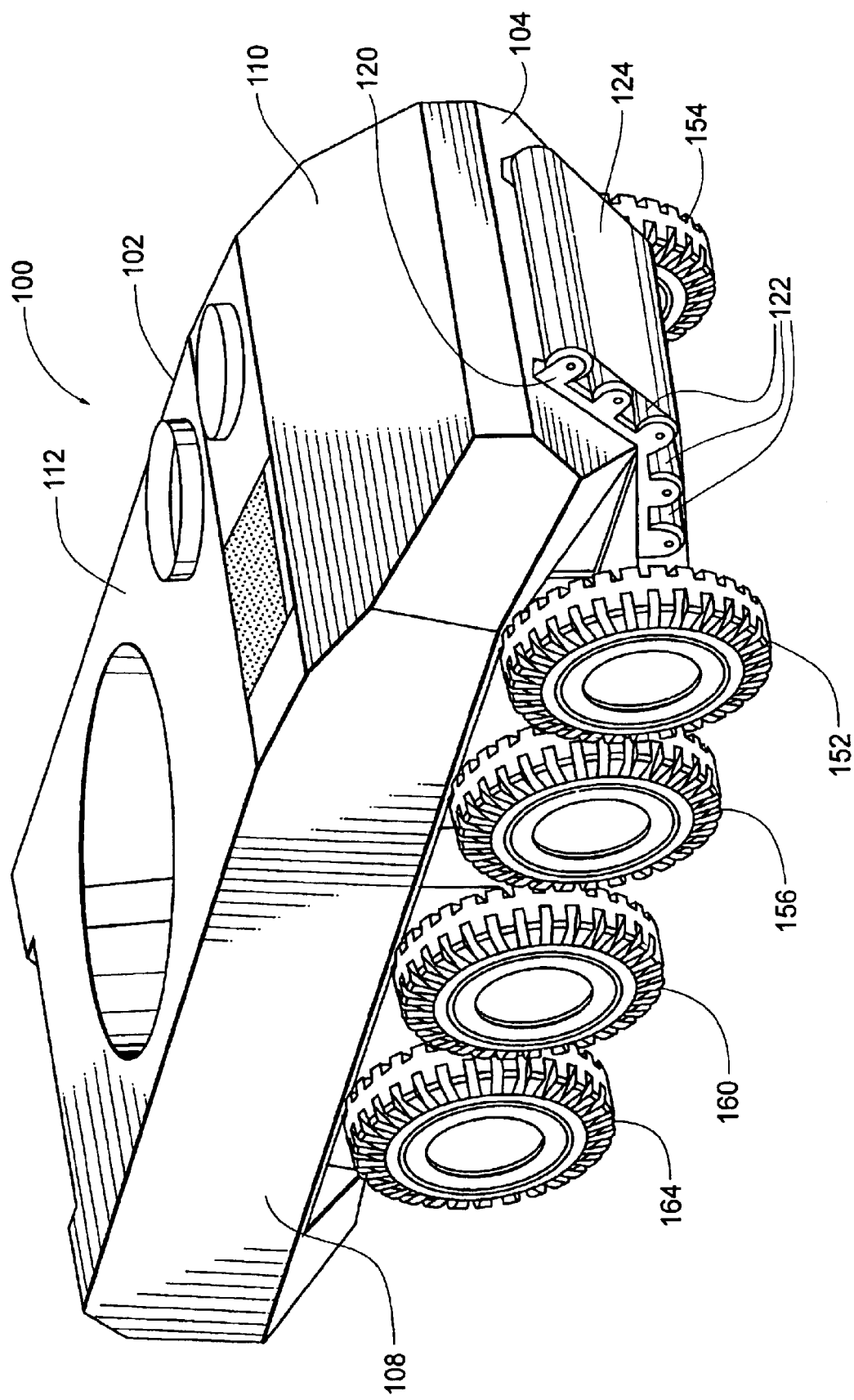
FIG. 1 is a perspective view of the vehicle of the present invention.
Figure 2:
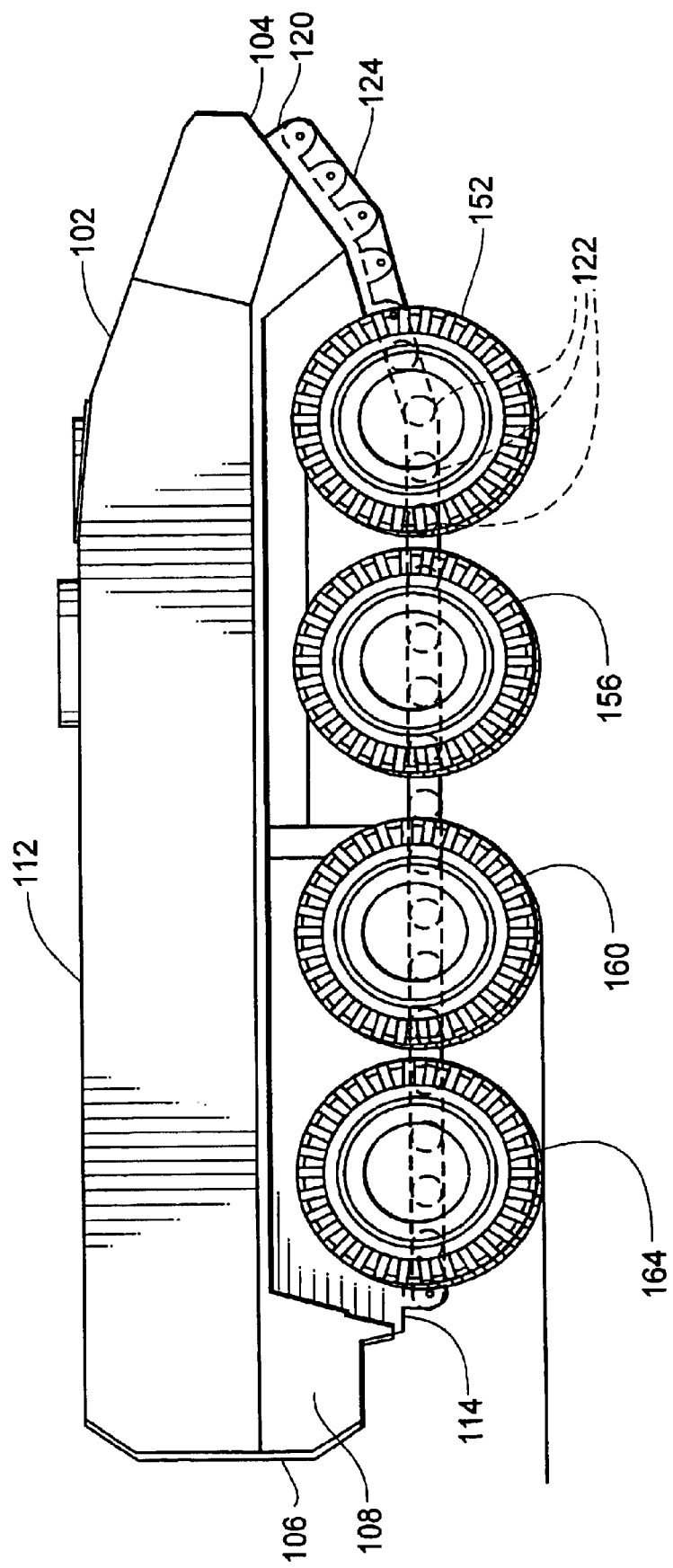
FIG. 2 is a side elevational view of the vehicle.

A vehicle 100 in accordance with the present invention broadly includes a Hull 102 having a front portion 104, rear portion 106, top 112, bottom 114, and opposing sides 108 and 110. An endless track assembly 120 is mounted under hull 102 directly to the bottom 114, and has track belt 124 which runs on rollers 122. Endless track assembly 120 covers substantially the entire surface of bottom 114 and wraps upward over a portion of front 104.

Figure 3:
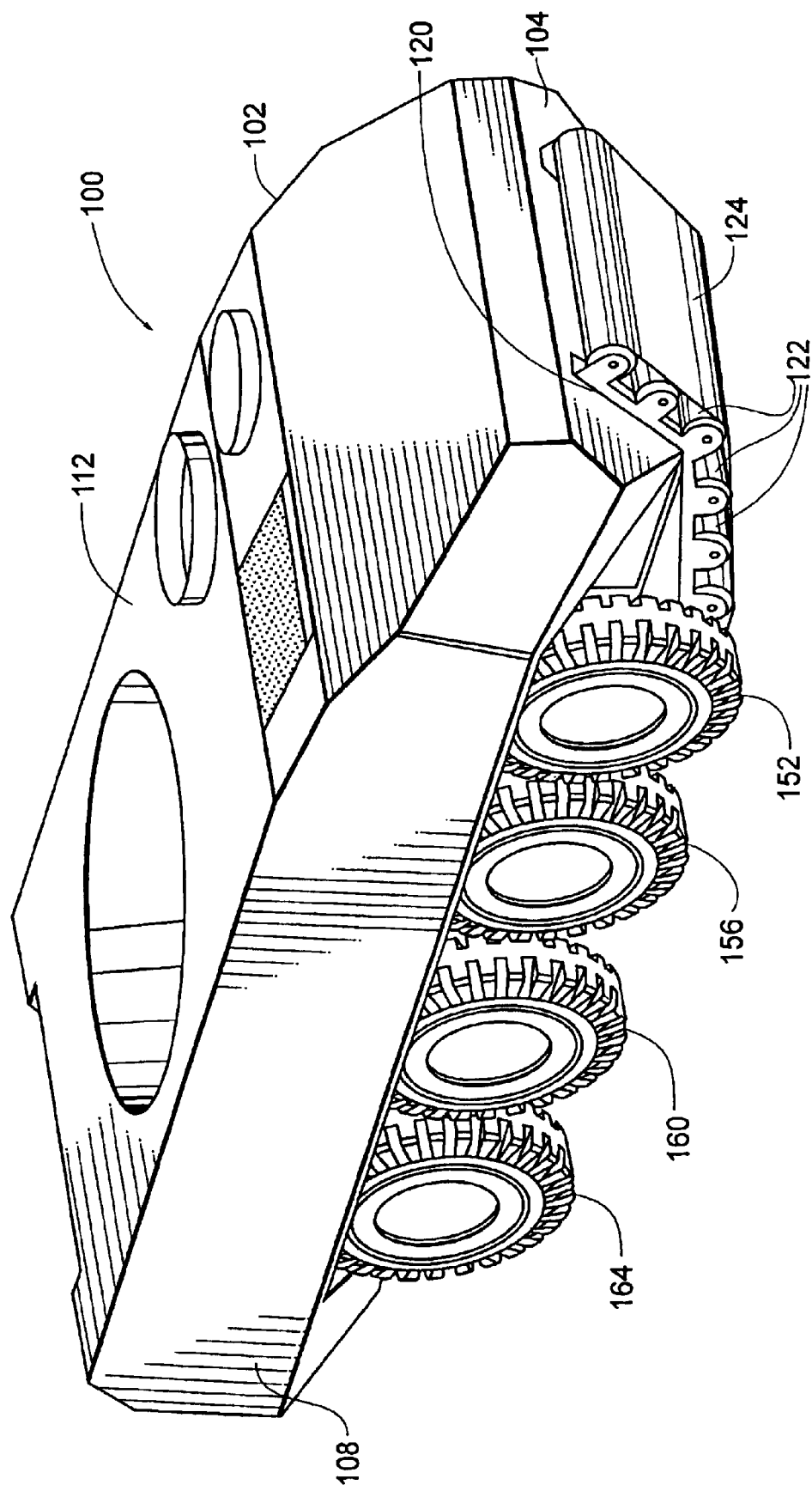
FIG. 3 is a perspective view of the vehicle of the present invention with the wheels in a retracted position.

Vehicle 100 has ground engaging traction mechanisms in the form of wheels 152, 154, 156, 158, 160, 162, 164 and 166, which are mounted to hull 102 proximate to opposing sides 108 and 110. Wheels 152, 154, 156, 158, 160, 162, 164, 166 are vertically moveable along a defined path of travel, so that vehicle 100 may be operated with only wheels 152, 154, 156, 158, 160, 162, 164, 166 in contact with the ground as shown in FIG. 1, or with only the endless track assembly 120 in contact with the ground as shown in FIG. 3. In addition to the terminal points in the path of travel, it is possible to position wheels 152, 154, 156, 158, 160, 162, 164, 166 at any intermediate position along the path of travel so that vehicle 100 may be operated with endless track assembly 120 and wheels 152, 154, 156, 158, 160, 162, 164,

166 in contact with the ground simultaneously. Other ground engaging traction mechanisms operably mounted to the hull, other than wheels, such as endless track mechanisms, could be used while remaining within the scope of the invention.

Figure 4:
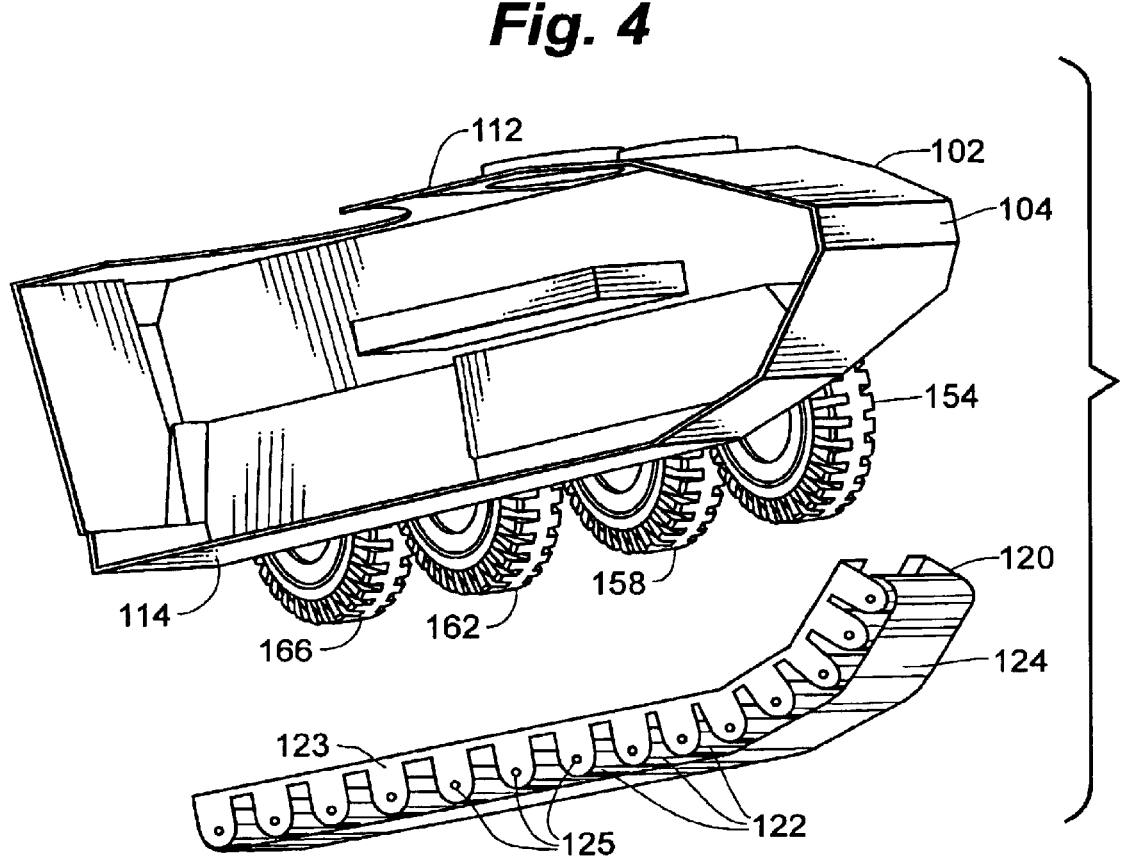
FIG. 4 is an exploded view of the vehicle.

Referring now to FIG. 4, it can be seen that endless track assembly 120 has frame portion 123, rigidly connected to bottom 114 of hull 102. Also, each of rollers 122 rotates on a separate one of axles 125, which are rigidly attached to frame portion 123. Track belt 124 rides directly on rollers 122. Thus, endless track assembly 120 has no resilient suspension. The lack of a resilient suspension for endless track assembly has unique advantages. First, the overall height of endless track assembly 120 is minimized, allowing it to be mounted to bottom 114 without intrusion into the interior space of hull 102. As a result, endless track assembly 120 is more easily accessible for maintenance, and the carrying volume of hull 102 is maximized. In addition, fewer parts are needed for the assembly, making for generally more reliable battlefield operation. Also, the lack of resilience in the suspension is of benefit when a stable, firm base is needed for fire control of vehicle mounted weaponry. At least one of rollers 122 has an internal motor, which may be hydraulic or electric, for providing motive power to endless track assembly 120. It is preferred that more than one of rollers 122 be provided with such an internal motor, since the power transmitting portions of rollers 122 and track belt 124 may be made of correspondingly lighter construction due to the more even distribution of power. For instance, track belt 124 may be made from elastomeric material in place of heavier metallic material as would be needed for power transmission where only one roller transmits power. It is preferred that the motors be continuously speed-variable over their entire range of operation to allow for maximum controllability of endless track assembly 120.

Figure 5:
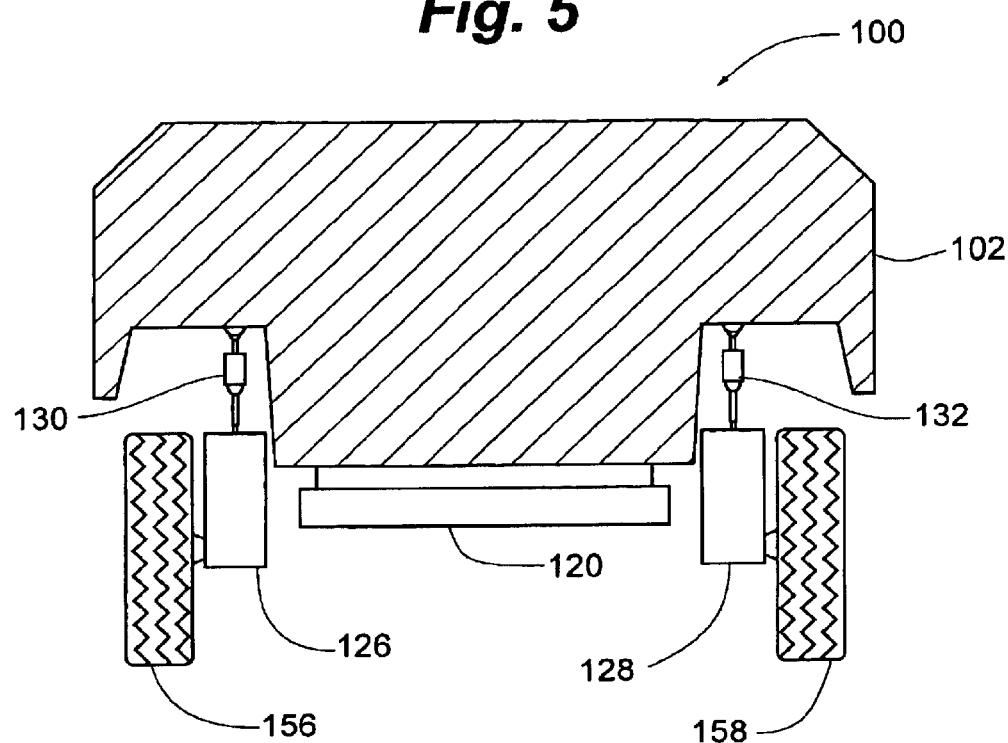
FIG. 5 is a cross-sectional view of the vehicle.
Figure 6:
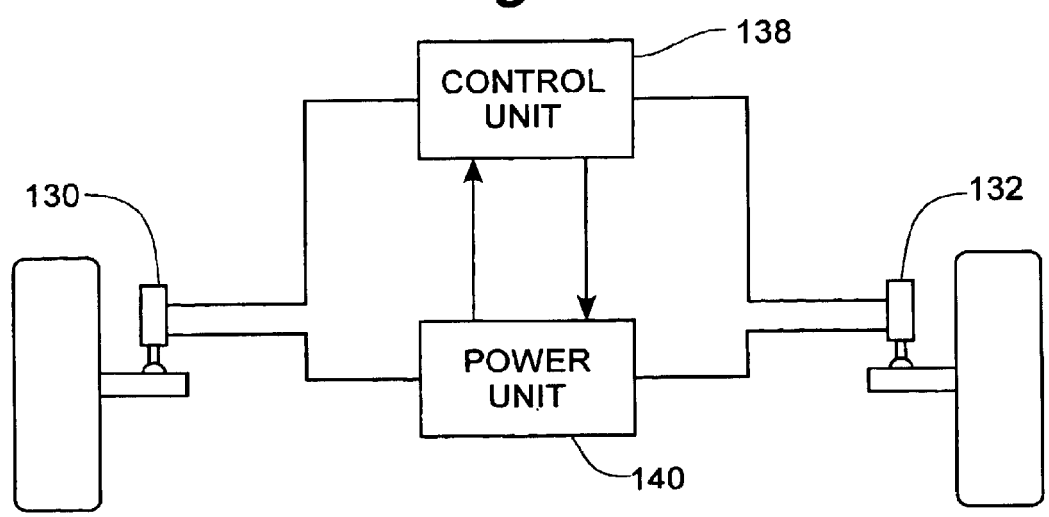
FIG. 6 is a schematic depiction of a variable height suspension system.

In a preferred embodiment of the invention, as depicted in the vehicle cross-sectional view of FIG. 5, wheels 156 and 158 are movable generally vertically along a defined path of travel by height variable suspension elements 130 and 132. These height variable suspension elements are preferably part of a common hydro-pneumatic suspension system, such as is depicted in FIG. 6 in block schematic diagram form. Height variable suspension elements 130 and 132 may be hydro-pneumatic springs having a gas-charged resilient portion to serve as a resilient suspension for the vehicle, and a separate hydraulic portion for height variability. Power unit 140 provides pressurized hydraulic fluid to height variable suspension elements 130 and 132. Control unit 138 provides sensing and control functions for the system and allows a user to selectively vary the height of height variable suspension elements 130 and 132, positioning the connected wheels or other ground engaging traction mechanism at any point along the defined path of travel. The vertically moveable wheels of the vehicle could also be implemented by means of a separate resilient suspension system using, for example, coil, leaf or torsion springs. The resilient suspension system may be coupled to the vehicle hull with any type of linear actuating element that will provide vertical adjustability such as a hydraulic or pneumatic actuator.

Referring again to FIG. 5, power units 126 and 128, which may be hydraulic or electric motors, provide motive power to each of wheels 156 and 158. It is preferred that power units 126 and 128 be continuously, separately, speed variable over their entire range of operation. To accomplish speed variability of the power units, a motor controller (not shown) may be provided, which may be a series of hydraulic valves for hydraulic power units, or electric for electric power units. It is also preferred that each of wheels 152, 154, 156, 158, 160, 162, 164, 166 be provided with a separate power unit, and that the source of power for the wheels be separate from the source of power for endless track assembly 120.

Referring again to the drawings, the operation and unique characteristics of the vehicle of the present invention will be explained. The vehicle may be operated in the wheels down mode as shown in FIG. 1 when maximum speed and maneuverability is desired. The vehicle wheels have an active suspension, provided by height variable suspension elements 130 and 132 as shown in exemplary fashion in FIG. 5, to absorb road and terrain shocks. When challenging terrain is encountered where a vehicle with wheels alone may become stuck, the vehicle may be lowered as shown in FIG. 3, using these height variable suspension elements, so that the vehicle rests either on endless track assembly 120 alone or with both endless track assembly 120 and wheels 152, 154, 156, 158, 160, 162, 164, 166 in contact with the ground. The portion of endless track assembly 120 that wraps upward over front portion 104 of hull 102 provides a means of engaging and surmounting obstacles such as large rocks.

The separate motive power and control sources for the motors in endless track assembly 120 and wheels 152, 154, 156, 158, 160, 162, 164, 166 allow each to be operated at separate or identical speeds as may be needed to extract the vehicle from the terrain. When vehicle 100 is resting on endless track assembly 120, a stable base for fire control of weapons is provided, due to the lack of a resilient suspension in endless track assembly 120. In addition, endless track assembly 120 provides a means for suppressing the effect of land mines, in that if endless track 120 of the vehicle is driven over a land mine, the mass of endless track unit 120 provides additional shielding for hull 102 from the effects of blast and shrapnel. If endless track unit 120 is damaged by the mine, the vehicle may be driven away by extending wheels 152, 154, 156, 158, 160, 162, 164, 166.

Maintenance and repair of the vehicle are enhanced by the simplicity and location of endless track unit 120. The lack of a resilient suspension reduces the number of component parts of the assembly, and also reduces its overall height. It is thus possible to mount the unit to bottom 114 of hull 102 with minimal intrusion into the internal volume of hull 102. Endless track unit 120 is made more easily accessible for maintenance, and the volume of hull 102 usable for carrying in increased.

Although the description above contains many specificities, these should not be construed as limiting the scope of the invention but as merely providing illustrations of some of the presently preferred embodiments of the invention. Thus, the scope of the invention should be determined by the appended claims and their legal equivalents, rather than by the examples given.

What is claimed is:

1. A vehicle for use on a battlefield, comprising:
   a hull;
   at least one endless track unit mounted under said hull;
   a plurality of wheels mounted on the hull, wheel having
       a resilient suspension mechanism and being selectively shiftable at least between a first position wherein the wheel is engaged with the around and a second position wherein the wheel is not engaged with the ground;
   a plurality of height variable suspension elements, each height variable suspension element operably coupled to a separate one of the wheels for selectively shifting the wheel between the first and second positions;

a power unit for selectively varying the height of the height variable suspension elements operably coupled with each of the height variable suspension elements; and control means for controlling the power unit and the height variable suspension elements;

whereby said vehicle may be operated with only said plurality of wheels, said plurality of wheels and said endless track unit in combination, or only said endless track unit in contact with the ground.

2. A vehicle for use on a battlefield, comprising:

a hull;

at least one endless track unit mounted under said hull;

a plurality of wheels mounted on the hull, each wheel selectively shiftable at least between a first position wherein the wheel is engaged with the ground and a second position wherein the wheel is not engaged with the ground;

a plurality of hydro-pneumatic springs, each spring operably coupling a separate one of the wheels with the hull for selectively shifting the wheels between the first and second positions, each spring including a gas charged resilient portion and a separate hydraulic portion for selectively varying the height of the spring;

a power unit coupled with the hydraulic portion of each spring for selectively varying the height of the springs;

control means for controlling the power unit and the hydro-pneumatic springs;

whereby said vehicle may be operated with only said plurality of wheels, said plurality of wheels and said endless track unit in combination, or only said endless track unit in contact with the ground.

3. The vehicle of claim 1, further comprising a plurality of motors, each said motor driving a separate one of said plurality of selectively vertically moveable wheels.

4. The vehicle of claim 3, further comprising control means for operating each of said plurality of motors at a separately selectable speed.

5. The vehicle of claim 1, wherein said hull has a back surface, a front surface, and a bottom surface, said bottom surface having an upwardly sloped front portion, and wherein said endless track unit is disposed proximate and substantially parallel with said bottom surface, substantially covering said bottom surface from a point proximate said back surface to said front surface, and covering a portion of said front surface.

6. The vehicle of claim 1, wherein said endless track unit has a plurality of driving rollers, and wherein each of said plurality of driving rollers has a separate driving motor.

7. The vehicle of claim 1, wherein said endless track unit has a rigid suspension.

8. The vehicle of claim 1, wherein said endless track unit has an elastomeric track.

9. The vehicle of claim 2, further comprising a plurality of motors, each said motor driving a separate one of said plurality of wheels.

10. The vehicle of claim 2, further comprising control means for operating each of said plurality of motors at a separately selectable speed.

11. The vehicle of claim 2, wherein said hull has a back surface, a front surface, and a bottom surface, a portion of said bottom surface sloping upwardly to the front surface, and wherein said endless track unit is disposed proximate and substantially parallel with said bottom surface, substantially covering said bottom surface from a point proximate said back surface to said front surface, and covering a portion of said front surface.

12. The vehicle of claim 2, wherein said endless track unit has a plurality of driving rollers, and wherein each of said plurality of driving rollers has a separate driving motor.

13. The vehicle of claim 2, wherein said endless track unit has a rigid suspension.

14. The vehicle of claim 2, wherein said endless track unit has an elastomeric track.

15. A vehicle for use on a battlefield, comprising:

a hull;

at least one endless track mechanism fixedly coupled to said hull;

at least one ground engaging traction mechanism including a plurality of wheels operably coupled to said hull, wherein each of said plurality of wheels has a resilient suspension mechanism;

a suspension assembly for shifting said at least one ground engaging traction mechanism along a path of travel between a first position operably engaging the ground of said battlefield and a second position clearing said ground, whereby said vehicle may be selectively self-transported over said ground by said at least one endless track mechanism, said at least one ground engaging traction mechanism, or by said at least one endless track mechanism and said at least one ground engaging traction mechanism in combination.

16. A vehicle for use on a battlefield, comprising:

a hull;

at least one endless track mechanism fixedly coupled to said hull;

at least one ground engaging traction mechanism including a plurality of wheels operably coupled to said hull;

a suspension assembly for shifting said at least one ground engaging traction mechanism along a path of travel between a first position operably engaging the ground of said battlefield and a second position clearing said ground, the suspension assembly including a plurality of hydro-pneumatic springs, a power unit, and a control unit, each of said hydro-pneumatic springs having a gas-charged resilient portion and a separate hydraulic portion for varying the height of the spring, each spring operably coupled to a separate one of said plurality of wheels and disposed so as to vertically move each of said plurality of wheels with movement of said hydro-pneumatic springs, said hydro-pneumatic springs being connected to said power unit and being controllable with said control unit, whereby said vehicle may be selectively self-transported over said ground by said at least one endless track mechanism, said at least one ground engaging traction mechanism, or by said at least one endless track mechanism and said at least one ground engaging traction mechanism in combination.

17. The vehicle of claim 15, further comprising a plurality of motors, each said motor driving a separate one of said plurality of wheels.

18. The vehicle of claim 17, further comprising control means for operating each of said plurality of motors at a separately selectable speed.

19. The vehicle of claim 15, wherein said hull has a back surface, a front surface, and a bottom surface, said bottom surface having an upwardly sloped front portion, and wherein said at least one endless track mechanism is disposed proximate and substantially parallel with said bottom surface, substantially covering said bottom surface from a point proximate said back surface to said front surface, and covering a portion of said front surface.

20. A vehicle for use on a battlefield, comprising:
a hull;
at least one endless track mechanism fixedly coupled to said hull, wherein said endless track mechanism has a plurality of driving rollers, and wherein each of said plurality of driving rollers has a separate driving motor;
at least one ground engaging traction mechanism operably coupled to said hull;
a suspension assembly for shifting said at least one ground engaging traction mechanism along a path of travel between a first position operably engaging the ground of said battlefield and a second position clearing said ground,
whereby said vehicle may be selectively self-transported over said ground by said at least one endless track mechanism, said at least one ground engaging traction mechanism, or by said at least one endless track mechanism and said at least one ground engaging traction mechanism in combination.

21. The vehicle of claim 15, wherein said endless track mechanism has a rigid suspension.

22. The vehicle of claim 15, wherein said endless track mechanism has an elastomeric track belt.

23. A vehicle for use on a battlefield, comprising:
a hull having a front portion and a back portion, said hull comprising at least a back surface, a front surface, a first side surface, an opposing second side surface, and a bottom surface, said bottom surface having an upwardly sloped front portion;
at least one endless track unit disposed under and substantially parallel with said bottom surface, said endless track unit extending from a point proximate said back surface to said front surface, and covering a portion of said front surface, said endless track unit being rigidly connected to said hull, said endless track unit having a plurality of driving rollers, each of said driving rollers having a separate track driving motor;
a first pair of selectively vertically moveable wheels coupled with said hull, each of said first pair of selectively vertically moveable wheels disposed proximate to a separate one of said first side surface and said second side surface;
a first pair of motors, each of said first pair of motors coupled to a separate one of said first pair of selectively vertically moveable wheels;
at least a second pair of selectively vertically moveable wheels coupled with said bull, each of said second pair of selectively vertically moveable wheels disposed proximate to a separate one of said first side surface and said second side surface; and
a second pair of motors, each of said second pair of motors coupled to a separate one of said second pair of selectively vertically moveable wheels.

24. The vehicle of claim 23, further comprising a hydro-pneumatic suspension system, said hydro-pneumatic suspension system being adapted to resiliently couple each of said first pair of selectively vertically moveable wheels and each of said second pair of selectively vertically moveable wheels with said hull.

25. The vehicle of claim 24, wherein said hydro-pneumatic suspension system has a control unit adapted to selectively vertically move each of said first pair of selectively vertically moveable wheels and each of said second pair of selectively vertically moveable wheels.

26. The vehicle of claim 23, further comprising a first pair of height variable suspension elements, a second pair of height variable suspension elements, a power unit, and a control unit, each of said first pair of height variable suspension elements coupled to a separate one of said first pair of selectively vertically moveable wheels, each of said second pair of height variable suspension elements coupled to a separate one of said second pair of selectively vertically moveable wheels, each of said first and second and second pairs of height variable suspension elements disposed so as to be capable of vertically moving the wheel to which it is coupled, said first and second pairs of height variable suspension elements being connected to said power unit, and said first and second pairs of height variable suspension elements being controllable with said control unit.

27. The vehicle of claim 26, wherein each said height variable suspension element is a hydro-pneumatic spring.

28. The vehicle of claim 26, wherein each of said plurality of wheels has a resilient suspension mechanism.

29. The vehicle of claim 23, wherein said endless track unit has an elastomeric track.

30. The vehicle of claim 23, further comprising a motor control unit, said motor control unit connected to each of said first pair of motors and each of said second pair of motors, said motor control unit adapted to operate each of said first pair of motors and said second pair of motors at a separately selectable speed.

31. A method of traversing soft terrain using a vehicle, comprising:
providing a vehicle having a hull with at least one endless track unit mounted under said hull, said endless track unit having a plurality of driving rollers, each of said plurality of driving rollers having a separate driving motor, said hull further having a plurality of selectively vertically moveable wheels mounted on said hull, each of said plurality of wheels being coupled to a separate motor;
vertically moving said plurality of wheels downward so that only said wheels are in contact with the ground;
driving said vehicle onto the soft terrain; vertically moving said plurality of wheels upward so that said endless track is in contact with the soft terrain; and
applying power to said driving motors of said plurality of driving rollers of said endless track unit so as to propel said vehicle across the soft terrain.

32. The method of claim 31, further comprising the step of selectively applying power to at least one of the separate motors connected to said wheels simultaneously with applying power to said driving motors of said plurality of driving rollers of said endless track unit.

33. The vehicle of claim 16, further comprising a plurality of motors, each said motor driving a separate one of said plurality of wheels.

34. The vehicle of claim 33, further comprising control means for operating each of said plurality of motors at a separately selectable speed.

35. The vehicle of claim 16, wherein said hull has a back surface, a front surface, and a bottom surface, said bottom surface having an upwardly sloped front portion, and wherein said at least one endless track mechanism is disposed proximate and substantially parallel with said bottom surface, substantially covering said bottom surface from a point proximate said back surface to said front surface, and covering a portion of said front surface.

36. The vehicle of claim 16, wherein said endless track mechanism has a rigid suspension.

37. The vehicle of claim 20, further comprising a plurality of motors, each said motor driving a separate one of said plurality of wheels.

38. The vehicle of claim 37, further comprising control means for operating each of said plurality of motors at a separately selectable speed.

39. The vehicle of claim 20, wherein said hull has a back surface, a front surface, and a bottom surface, said bottom surface having an upwardly sloped front portion, and wherein said at least one endless track mechanism is disposed proximate and substantially parallel with said bottom surface, substantially covering said bottom surface from a point proximate said back surface to said front surface, and covering a portion of said front surface.

40. The vehicle of claim 20, wherein said endless track mechanism has a rigid suspension.

* * * * *

UNITED STATES PATENT AND TRADEMARK OFFICE
CERTIFICATE OF CORRECTION

| | | |
|---|---|---|
| PATENT NO. | : 6,866,108 B2 | Page 1 of 1 |
| DATED | : March 15, 2005 | |
| INVENTOR(S) | : Dennis W. Borgwarth and Brad J. Breeggemann | |

It is certified that error appears in the above-identified patent and that said Letters Patent is hereby corrected as shown below:

<u>Column 6,</u>
Line 62, please delete "around" and insert -- ground --

Signed and Sealed this

Twenty-fourth Day of May, 2005

JON W. DUDAS
*Director of the United States Patent and Trademark Office*